United States Patent
Ichikawa et al.

(10) Patent No.: US 9,140,549 B2
(45) Date of Patent: Sep. 22, 2015

(54) PHYSICAL QUANTITY DETECTION ELEMENT, PHYSICAL QUANTITY DETECTION DEVICE, AND ELECTRONIC APPARATUS

(75) Inventors: Fumio Ichikawa, Ebina (JP); Yoichi Okumura, Minowa (JP); Takayuki Kikuchi, Okaya (JP)

(73) Assignee: Seiko Epson Corporation (JP)

( * ) Notice: Subject to any disclaimer, the term of this patent is extended or adjusted under 35 U.S.C. 154(b) by 302 days.

(21) Appl. No.: 13/568,454

(22) Filed: Aug. 7, 2012

(65) Prior Publication Data
US 2013/0036819 A1    Feb. 14, 2013

(30) Foreign Application Priority Data
Aug. 9, 2011    (JP) .................................. 2011-173613

(51) Int. Cl.
*G01C 19/56*    (2012.01)
*G01C 19/5607*    (2012.01)

(52) U.S. Cl.
CPC ................... *G01C 19/5607* (2013.01)

(58) Field of Classification Search
USPC ............... 73/504.16, 504.12, 504.14, 504.15, 73/504.04
See application file for complete search history.

(56) References Cited

U.S. PATENT DOCUMENTS

| | | | | |
|---|---|---|---|---|
| 6,018,212 A * | 1/2000 | Kikuchi et al. | ................ | 310/321 |
| 6,186,003 B1 | 2/2001 | Kikuchi et al. | | |
| 7,401,517 B2 | 7/2008 | Pan et al. | | |
| 7,528,533 B2 | 5/2009 | Ochi et al. | | |
| 8,516,887 B2 * | 8/2013 | Acar et al. | ................. | 73/504.08 |
| 2001/0001928 A1 * | 5/2001 | Kikuchi et al. | ............. | 73/504.12 |
| 2005/0006988 A1 * | 1/2005 | Kawauchi et al. | ............. | 310/367 |
| 2005/0011267 A1 * | 1/2005 | Kikuchi | ......................... | 73/649 |
| 2006/0201248 A1 * | 9/2006 | Unno | ......................... | 73/504.12 |

FOREIGN PATENT DOCUMENTS

| | | |
|---|---|---|
| JP | 11-014366 | 1/1999 |
| JP | 11-014373 | 1/1999 |
| JP | 2003-315046 | 11/2003 |
| JP | 2003315046 A * | 11/2003 |
| JP | 2006-267094 | 10/2006 |
| JP | 2007-108053 | 4/2007 |
| JP | 3999377 | 8/2007 |
| JP | 2010-501831 | 1/2010 |
| WO | 2006-075764 | 7/2006 |

OTHER PUBLICATIONS

JP 2003315046 A_English translation.*

* cited by examiner

*Primary Examiner* — Hezron E Williams
*Assistant Examiner* — Xin Zhong
(74) *Attorney, Agent, or Firm* — Harness, Dickey & Pierce, P.L.C.

(57) ABSTRACT

A physical quantity detection element includes a base part, a first connection part and a second connection part respectively extending from the base part in opposite directions to each other along the X-axis, a pair of first drive vibrating arm and second drive vibrating arm and a pair of third drive vibrating arm and fourth drive vibrating arm respectively extending from the first connection part or the second connection part in opposite directions to each other along the Y-axis, a first drive detection vibrating arm and a second drive detection vibrating arm obliquely extending from the first connection part, a third drive detection vibrating arm and a fourth drive detection vibrating arm obliquely extending from the second connection part, and a first detection vibrating arm and a second detection vibrating arm respectively extending from the base part in opposite directions to each other along the Y-axis.

16 Claims, 10 Drawing Sheets

PHYSICAL QUANTITY DETECTION ELEMENT, PHYSICAL QUANTITY DETECTION DEVICE, AND ELECTRONIC APPARATUS

BACKGROUND

1. Technical Field

The present invention relates to an element that can detect a physical quantity using a vibrating reed.

2. Related Art

In related art, as a physical quantity detection element, Patent Document 1 (JP-A-2007-108053) has disclosed a vibrating reed (a vibrator in the document) including a base part, support parts respectively extending from the base part in opposite directions to each other along an X-axis direction, drive arms (drive vibrating arms) respectively extending in opposite directions to each other along a Y-axis direction at respective ends of the support parts, Y-axis detection vibrating arms respectively extending from the base part in opposite directions to each other along the Y-axis direction, and Z-axis detection vibrating arms respectively extending from the base part in opposite directions to each other along the Y-axis direction. According to the vibrating reed, parasitic oscillations of the Y-axis detection vibrating arms due to a rotation angular velocity around the Z-axis may be suppressed and an error of a measurement value of the rotation angular velocity may be reduced.

Further, there has been a vibrating reed (inertia sensor element in the document) disclosed in Patent Document 2 (JP-A-2006-267094), for example. The vibrating reed has a simple configuration in which vibration units with plural leg parts are provided, and the vibration units respectively extend from a base part in opposite directions to each other along a first direction and further respectively extend from the base part in opposite directions to each other along a second direction orthogonal to the first direction. Regarding the vibration units along the first direction, an excitation electrode is provided on one of the units and a detection electrode is provided on the other for detection of the rotation angular velocity (physical quantity) around the first direction. Similarly, the vibration units along the second direction can detect the rotation angular velocity around the second direction.

However, in Patent Document 1, the vibrating reed has the configuration in which the drive arms or leg parts extending along the Y-axis vibrate in the X-axis direction, and may perform only rotation detection around the Z-axis or rotation detection around the Y-axis, but may not perform rotation detection around the X-axis. The same is true in Patent Document 2. Further, these vibrating reeds have configurations in which the drive arms or the vibration units having the excitation electrodes individually extend from the base part, and thus, the connectivity of the respective vibration modes is weak and, for excitation of both vibrations with one oscillator circuit, fine adjustment for bringing their natural frequencies extremely closer is necessary. As measures therefor, a vibrating reed excited by two oscillator circuits is conceivable, however, according to this configuration, there has been a problem that the area of the circuit configuration part becomes larger, and downsizing becomes difficult and the cost increases.

SUMMARY

An advantage of some aspects of the invention is to solve at least a part of the problems described above and the invention can be implemented as the following application examples or embodiments.

APPLICATION EXAMPLE 1

This application example is directed to a physical quantity detection element including a base part, when coordinate axes having an X-axis passing through the origin as a center of gravity of the base part and a Y-axis passing through the origin and being orthogonal to the X-axis are defined, and when a region in which both an X-coordinate and a Y-coordinate take positive values is defined as the first quadrant, a region in which the X-coordinate takes a negative value and the Y-coordinate takes a positive value is defined as the second quadrant, a region in which both the X-coordinate and the Y-coordinate take negative values is defined as the third quadrant, and a region in which the X-coordinate takes a positive value and the Y-coordinate takes a negative value is defined as the fourth quadrant, a first connection part and a second connection part connecting to the base part and provided at both sides of the base part along the X-axis, a first drive vibrating arm and a second drive vibrating arm respectively extending from the first connection part in opposite directions to each other along the Y-axis, a third drive vibrating arm and a fourth drive vibrating arm respectively extending from the second connection part in opposite directions to each other along the Y-axis, a first drive detection vibrating arm extending in the first quadrant direction and obliquely extending with respect to the X-axis from the first connection part side of the first drive vibrating arm, a second drive detection vibrating arm extending in the fourth quadrant direction and obliquely extending with respect to the X-axis from the first connection part side of the second drive vibrating arm, a third drive detection vibrating arm extending in the second quadrant direction and obliquely extending with respect to the X-axis from the second connection part side of the third drive vibrating arm, and a fourth drive detection vibrating arm extending in the third quadrant direction and obliquely extending with respect to the X-axis from the second connection part side of the fourth drive vibrating arm.

According to the physical quantity detection element, the first drive detection vibrating arm and the second drive detection vibrating arm that perform drive detection vibrations respectively extend from the first connection part in obliquely opposite directions, and the extension directions are toward the opposite sides to the base part, i.e., outside of the physical quantity detection element. In the physical quantity detection element having the configuration, stress at the first connection part side of the first drive vibrating arm contributes to excitation of the first drive detection vibrating arm and stress at the first connection part side of the second drive vibrating arm contributes to excitation of the second drive detection vibrating arm, and connectivity is improved. Accordingly, the so-called leakage vibration that vibrations are transmitted from the first drive vibrating arm and the second drive vibrating arm and the first drive detection vibrating arm and the second drive detection vibrating arm to the first connection part may be suppressed. Similarly, the leakage vibration may be suppressed at the second connection part sides of the third drive vibrating arm and the fourth drive vibrating arm and the third drive detection vibrating arm and the fourth drive detection vibrating arm. Thereby, in the physical quantity detection element, the impedance as the physical quantity detection element becomes lower and the Q-value may be made higher by the suppression of the leakage vibration. Further, adjustment of tuning the respective natural resonance frequencies of the respective drive vibrating arms and drive detection vibrating arms is unnecessary and the connectivity in bases is higher, and thus, two drive modes may be excited by one oscillator circuit. In this case, the physical quantity detection element may detect the physical quantity of the angular velocity or the like around the X-axis or the Y-axis using the first drive detection vibrating arm, the second drive detection vibrating arm, the third drive detection vibrating arm, and the fourth drive detection vibrating arm, and can detect physical quantities of angular velocities or the like around two axes by itself.

APPLICATION EXAMPLE 2

This application example is directed to a physical quantity detection element including a base part, when coordinate axes having an X-axis passing through the origin as a center of gravity of the base part and a Y-axis passing through the origin and being orthogonal to the X-axis are defined, and when a region in which both an X-coordinate and a Y-coordinate take positive values is defined as the first quadrant, a region in which the X-coordinate takes a negative value and the Y-coordinate takes a positive value is defined as the second quadrant, a region in which both the X-coordinate and the Y-coordinate take negative values is defined as the third quadrant, and a region in which the X-coordinate takes a positive value and the Y-coordinate takes a negative value is defined as the fourth quadrant, a first connection part and a second connection part connecting to the base part and provided at both sides of the base part along the X-axis, a first drive vibrating arm and a second drive vibrating arm respectively extending from the first connection part in opposite directions to each other along the Y-axis, a third drive vibrating arm and a fourth drive vibrating arm respectively extending from the second connection part in opposite directions to each other along the Y-axis, a first drive detection vibrating arm extending in the second quadrant direction and obliquely extending with respect to the X-axis from the first connection part side of the first drive vibrating arm, a second drive detection vibrating arm extending in the third quadrant direction and obliquely extending with respect to the X-axis from the first connection part side of the second drive vibrating arm, a third drive detection vibrating arm extending in the first quadrant direction and obliquely extending with respect to the X-axis from the second connection part side of the third drive vibrating arm, and a fourth drive detection vibrating arm extending in the fourth quadrant direction and obliquely extending with respect to the the X-axis from the second connection part side of the fourth drive vibrating arm.

According to the physical quantity detection element, the first drive detection vibrating arm and the second drive detection vibrating arm that perform drive detection vibrations respectively extend from the first connection part in obliquely opposite directions, and the extension directions are toward the base part, i.e., inside of the physical quantity detection element. In the physical quantity detection element having the configuration, stress at the first connection part side of the first drive vibrating arm contributes to excitation of the first drive detection vibrating arm and stress at the first connection part side of the second drive vibrating arm contributes to excitation of the second drive detection vibrating arm, and connectivity is improved. Accordingly, the so-called leakage vibration that vibrations are transmitted from the first drive vibrating arm and the second drive vibrating arm and the first drive detection vibrating arm and the second drive detection vibrating arm to the first connection part may be suppressed. Similarly, the leakage vibration may be suppressed at the second connection part sides of the third drive vibrating arm and the fourth drive vibrating arm and the third drive detection vibrating arm and the fourth drive detection vibrating arm. Thereby, in the physical quantity detection element, the impedance as the physical quantity detection element becomes lower and the Q-value may be made higher by the suppression of the leakage vibration. Further, adjustment of tuning the respective natural resonance frequencies of the drive vibrating arms and the drive detection vibrating arms is unnecessary and the connectivity in the bases is higher, and thus, two drive modes may be excited by one oscillator circuit. In this case, the physical quantity detection element may detect the physical quantity of the angular velocity or the like around the X-axis or the Y-axis using the first drive detection vibrating arm, the second drive detection vibrating arm, the third drive detection vibrating arm, and the fourth drive detection vibrating arm, and can detect physical quantities of angular velocities or the like around two axes by itself. Furthermore, the physical quantity detection element has the configuration in which the obliquely extending first drive detection vibrating arm to fourth drive detection vibrating arm extend toward the base part, i.e., inside of the physical quantity detection element. Accordingly, the size may be further reduced compared to the case where the first drive detection vibrating arm to fourth drive detection vibrating arm extend toward outside of the physical quantity detection element.

APPLICATION EXAMPLE 3

It is preferable that the physical quantity detection element according to the above described application example further includes a first detection vibrating arm and a second detection vibrating arm respectively extending from the base part in opposite directions to each other along the Y-axis.

According to this configuration, the physical quantity detection element further includes the first detection vibrating arm and the second detection vibrating arm and the first detection vibrating arm and the second detection vibrating arm respectively extend in opposite directions to each other along the Y-axis, and the physical quantity of the angular velocity or the like around the Z-axis may be detected. Thereby, the physical quantity detection element may simultaneously detect physical quantities around the three axes by itself.

APPLICATION EXAMPLE 4

In the physical quantity detection element according to the above described application example, it is preferable that the first drive vibrating arm to the fourth drive vibrating arm comprise drive signal electrodes for exciting vibrations, and the first drive detection vibrating arm to the fourth drive detection vibrating arm comprise drive signal electrodes for exciting vibrations and detection signal electrodes for detecting physical quantities.

According to this configuration, the first drive detection vibrating arm, the second drive detection vibrating arm, the third drive detection vibrating arm, and the fourth drive detection vibrating arm have the drive signal electrodes and the detection signal electrodes, and the arms themselves drive-vibrate by the drive signal electrodes and drive-vibrate without unwanted noise or the like by excitation also applied from the first drive vibrating arm and the second drive vibrating arm, or the third drive vibrating arm, and the fourth drive vibrating arm. Accordingly, in this case, the first drive detection vibrating arm to the fourth drive detection vibrating arm may detect the physical quantity of the angular velocity or the like around the X-axis or the Y-axis more reliably.

APPLICATION EXAMPLE 5

In the physical quantity detection element according to the above described application example, it is preferable that the first drive detection vibrating arm and the second drive detection vibrating arm extend to avoid an extension of the first connection part, and the third drive detection vibrating arm and the fourth drive detection vibrating arm extend to avoid an extension of the second connection part.

According to this configuration, the first drive detection vibrating arm and the second drive detection vibrating arm are not formed on the extension of the first connection part extending from the base part and extend from positions around the extension on the first drive vibrating arm and the second drive vibrating arm. Thereby, the connectivity of the first drive detection vibrating arm and the second drive detection vibrating arm to the first drive vibrating arm or the second drive vibrating arm may be improved in the positions away from the first connection part. Further, the third drive detection vibrating arm and the fourth drive detection vibrating arm similarly extend from positions around the extension on the third drive vibrating arm and the fourth drive vibrating arm, and the connectivity to the third drive vibrating arm and the fourth drive vibrating arm may be improved in the positions away from the second connection part. Therefore, the physical quantity detection element may suppress the leakage vibration from the first drive vibrating arm to the fourth drive vibrating arm toward the base part more reliably.

APPLICATION EXAMPLE 6

In the physical quantity detection element according to the above described application example, it is preferable that the first drive detection vibrating arm vibrates in the same phase as that of the first drive vibrating arm, the second drive detection vibrating arm vibrates in the same phase as that of the second drive vibrating arm vibrating in an opposite phase to that of the first drive vibrating arm, the third drive detection vibrating arm vibrates in the same phase as that of the third drive vibrating arm, and the fourth drive detection vibrating arm vibrates in the same phase as that of the fourth drive vibrating arm vibrating in an opposite phase to that of the third drive vibrating arm.

According to the configuration, further, in the physical quantity detection element, the first drive vibrating arm and the first drive detection vibrating arm, and the second drive vibrating arm and the second drive detection vibrating arm vibrate in opposite phases to each other with respect to the X-axis, and the third drive vibrating arm and the third drive detection vibrating arm, and the fourth drive vibrating arm and the fourth drive detection vibrating arm vibrate in opposite phases to each other with respect to the X-axis. Thereby, in the physical quantity detection element, well-balanced drive vibrations may be excited and unwanted vibration noise or the like is hard to be generated.

APPLICATION EXAMPLE 7

In the physical quantity detection element according to the above described application example, it is preferable that the first drive detection vibrating arm to the fourth drive detection vibrating arm comprise groove parts.

According to this configuration, the first drive detection vibrating arm to the fourth drive detection vibrating arm have groove parts, and thus, the surface areas of the arm parts may be increased and the electric fields are widely distributed and vibrations with larger amplitudes may be obtained. Further, even when the first drive detection vibrating arm to the fourth drive detection vibrating arm are downsized and their external dimensions are made smaller, the surface areas of the vibrating arm parts may be maintained or increased by formation of the groove parts, and vibrations with larger amplitudes may be obtained.

APPLICATION EXAMPLE 8

It is preferable that the physical quantity detection element according to the above described application example is formed using a piezoelectric material having a crystal structure of hexagonal crystal.

According to this configuration, the piezoelectric material of hexagonal crystal has the mechanical axis, the electrical axis, and the optical axis like crystal, for example, and precisely vibrates according to the applied drive signal, and flexes in response to the applied force and generates a detection signal. If the piezoelectric material is used for formation of the physical quantity detection element, detection of the physical quantity of the angular velocity or the like may be performed with high accuracy. Further, as a preferable example in the physical quantity detection element, a configuration in which the first drive vibrating arm and the second drive detection vibrating arm, the second drive vibrating arm and the first drive detection vibrating arm, the third drive vibrating arm and the fourth drive detection vibrating arm, and the fourth drive vibrating arm and the third drive detection vibrating arm respectively form angles of 120 degrees is conceivable. In this case, the piezoelectric material of hexagonal crystal has three electrical axes (X-axes) respectively having interior angles of 120 degrees, and thus, even the arm configuration as in the physical quantity detection element as one example may be easily formed. Further, the physical quantity detection element including the configuration example as one example has higher connectivity in the bases, and thus, when vibrations of the respective drive vibrating arms are excited, the vibrations of the respective drive vibrating arms contribute to the excitation of the corresponding drive detection vibrating arms more easily. The physical quantity detection element having the higher connectivity configuration may form a system with one driver circuit for obtaining vibration modes in two directions, for example, and is more advantageous for reduction in size and cost.

APPLICATION EXAMPLE 9

This application example is directed to a physical quantity detection device including a driver circuit that supplies drive signals at least to the first drive vibrating arm to the fourth drive vibrating arm, and a detector circuit that detects a physical quantity from detection signals at least of the first drive detection vibrating arm to the fourth drive detection vibrating arm.

According to the physical quantity detection device, the physical quantity detection element that can suppress the leakage vibration is provided and the physical quantity detection element is controlled by the driver circuit and the detector circuit, and thereby, detection accuracy of the physical quantity such as the angular velocity may be greatly improved. In this case, the physical quantity detection device having the configuration like the application example may excite vibrations by one driver circuit even when having plural arms. Note that the driver circuit corresponds to the oscillator circuit in the background technology.

APPLICATION EXAMPLE 10

In the physical quantity detection device according to the application example, it is preferable that the detector circuit takes difference between a sum of the detection signal generated in the first drive detection vibrating arm and the detection signal generated in the third drive detection vibrating arm and a sum of the detection signal generated in the second drive detection vibrating arm and the detection signal generated in the fourth drive detection vibrating arm, and detects the physical quantity.

According to this configuration, the difference between the respective sums of the detection signals by the first drive detection vibrating arm and the third drive detection vibrating arm and the detection signals by the second drive detection vibrating arm and the fourth drive detection vibrating arm is taken, and thereby, the physical quantity of the angular velocity or the like around the X-axis may be detected in this case.

APPLICATION EXAMPLE 11

In the physical quantity detection device according to the application example, it is preferable that the detector circuit takes difference between a sum of the detection signal generated in the first drive detection vibrating arm and the detection signal generated in the second drive detection vibrating arm and a sum of the detection signal generated in the third drive detection vibrating arm and the detection signal generated in the fourth drive detection vibrating arm, and detects the physical quantity.

According to this configuration, the difference between the respective sums of the detection signals of the first drive detection vibrating arm and the second drive detection vibrating arm and the detection signals of the third drive detection vibrating arm and the fourth drive detection vibrating arm is taken, and thereby, the physical quantity of the angular velocity or the like around the Y-axis may be detected in this case.

APPLICATION EXAMPLE 12

This application example is directed to an electronic apparatus including the physical quantity detection element according to the above described application example.

According to the electronic apparatus, the physical quantity detection element that may improve the detection accuracy of the physical quantities by suppressing the leakage vibration is provided, and thereby, a sensor function with high accuracy may be provided and the equipment performance may be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a preferred example of a physical quantity detection element of the invention will be explained with reference to the accompanying drawings. Here, a gyro element (physical quantity detection element) using a piezoelectric material having good vibration characteristics as a material will be described.

First, crystal as a piezoelectric single-crystal material most appropriate for the gyro element will be explained. The gyro element as the physical quantity detection element is cut out from a crystal column forming a hexagonal column. The crystal column has a z-axis as an optical axis in the longitudinal direction of the column and an x-axis as an electrical axis and a y-axis as a mechanical axis perpendicular to the z-axis, and has a property of the so-called hexagonal crystal. Here, there are three X-axes respectively having equal interior angles of 120 degrees in the x-y plane as a hexagonal surface perpendicular to the z-axis, and etching rates or the like depending on etching directions are the same within the respective surfaces formed by these x-axes. In the crystal column, the gyro element is cut out from a crystal z plate along a plane obtained by tilting the x-y plane to an angle of five degrees around the x-axis as seen from the intersection of the x-axis and the y-axis (coordinate origin). That is, the coordinate axes of the gyro element cut out from the crystal column are x (X-axis in the appended claims), y' (Y-axis in the appended claims), and z' (Z-axis in the appended claims).

Generally, in a physical quantity detection element, in order to obtain good measurement sensitivity, it is requested to keep a fixed vibration frequency difference between a natural resonance frequency of a drive vibration mode and a natural resonance frequency of a detection vibration mode. However, the piezoelectric crystal has anisotropy and, when the crystal face changes, the degree of the temperature change or the like of the vibration frequency becomes different. On the other hand, a gyro element 1 is adapted so that the respective vibrating arms as a whole may vibrate within a predetermined surface using only the crystal face having the best temperature characteristics or the like of the crystal, e.g., the crystal z plate. Thereby, the gyro element that performs extremely stable vibration may be provided. As below, the respective embodiments according to the shapes of the gyro element will be first explained.

Embodiment 1

Figure 1:
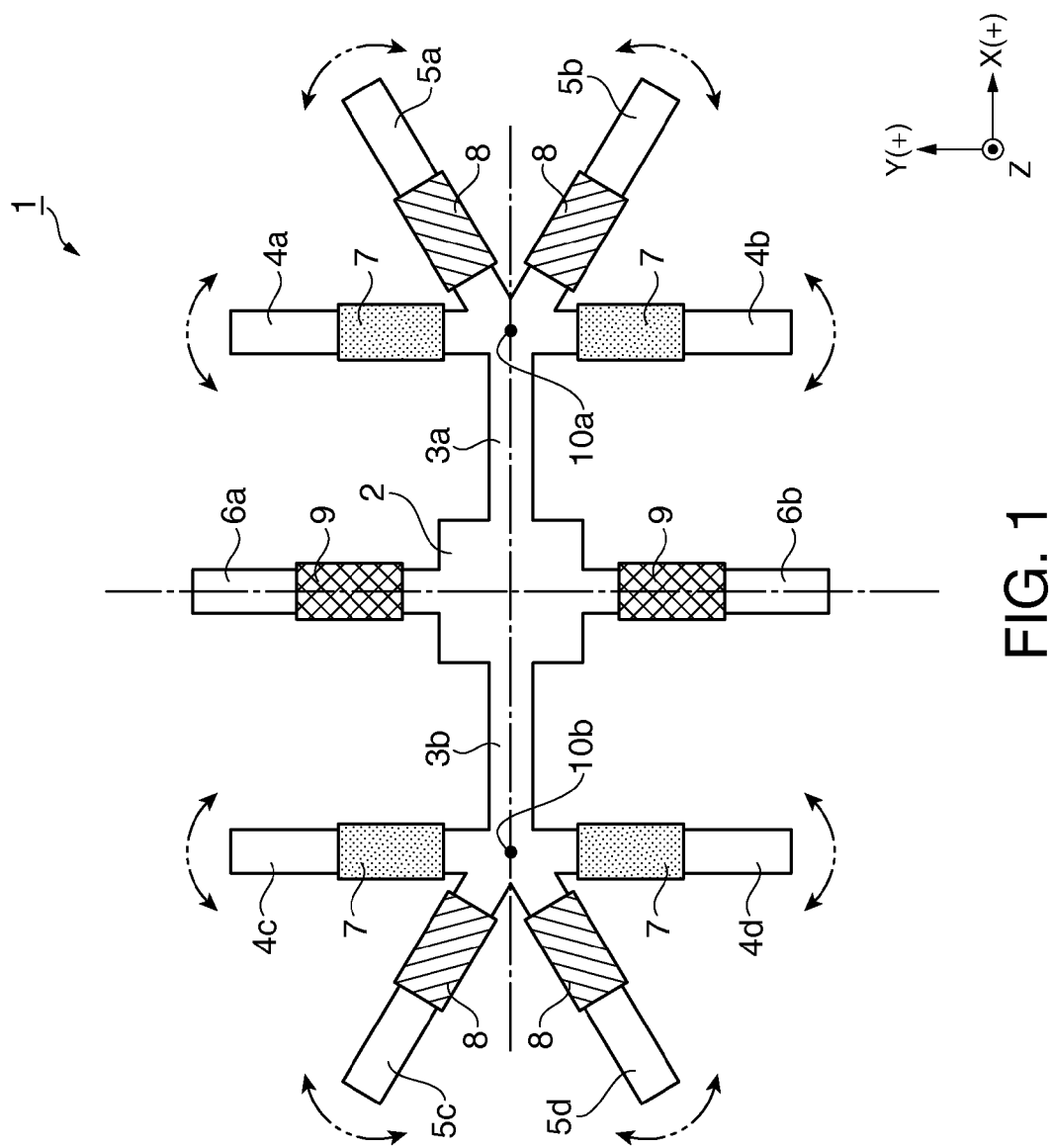
FIG. 1 is a plan view showing a configuration of a gyro element in Embodiment 1.

FIG. 1 is a plan view showing a configuration of a gyro element in Embodiment 1. As shown in FIG. 1, the gyro element (physical quantity detection element) 1 has a form in which, in X, Y, Z coordinates with respect to the center of gravity of a base part 2 (the center position of the base part 2 in this case) as the origin, arms etc. extend along the X-Y plane. Note that the X, Y, Z coordinates are coordinate axes having an X-axis passing through the origin, a Y-axis passing through the origin and being orthogonal to the X-axis, and a Z-axis passing through the origin and being orthogonal to the X-axis and the Y-axis. Further, on the coordinate axes, a region in which both the X-coordinate and the Y-coordinate take positive values is defined as the first quadrant, a region in which the X-coordinate takes a negative value and the Y-coordinate takes a positive value is defined as the second quadrant, a region in which both the X-coordinate and the Y-coordinate take negative values is defined as the third quadrant, and a region in which the X-coordinate takes a positive value and the Y-coordinate takes a negative value is defined as the fourth quadrant. Further, the X-axis, the Y-axis, and the Z-axis here correspond to the X-axis, the Y-axis, and the Z-axis in the appended claims. Furthermore, the positive X-axis, the positive Y-axis, and the positive Z-axis in the appended claims are shown by X(+), Y(+), and Z(+), and the negative X-axis, the negative Y-axis, and the negative Z-axis are shown by X(−), Y(−), and Z(−).

The gyro element 1 has the base part 2 having a square shape centered on the origin of the coordinate axes, a first connection part 3a extending from the base part 2 in the X(+)-axis direction, a first drive vibrating arm 4a extending from the end of the first connection part 3a in the Y(+) direction at a right angle with respect to the X-axis, a second drive vibrating arm 4b extending from the end of the first connection part 3a in the Y(−) direction at a right angle with respect to the X-axis, a first drive detection vibrating arm 5a obliquely extending from a base 10a as an intersection part of the first connection part 3a and the first drive vibrating arm 4a toward the first quadrant at an angle of 30 degrees with respect to the X-axis, and a second drive detection vibrating arm 5b obliquely extending from the base 10a as the intersection part of the first connection part 3a and the second drive vibrating arm 4b toward the fourth quadrant at an angle of 30 degrees with respect to the X-axis.

Note that the width of the base part 2 along the Y-axis may be equal to the width of the first connection part 3a along the Y-axis.

Further, the gyro element 1 has a second connection part 3b projecting from the base part 2 in the X(−)-axis direction, a third drive vibrating arm 4c extending from the end of the second connection part 3b in the Y(+) direction at a right angle with respect to the X-axis, a fourth drive vibrating arm 4d extending from the end of the second connection part 3b in the Y(−) direction at a right angle with respect to the X-axis, a third drive detection vibrating arm 5c obliquely extending from a base 10b as an intersection part of the second connection part 3b and the third drive vibrating arm 4c toward the second quadrant at an angle of 30 degrees with respect to the X-axis, and a fourth drive detection vibrating arm 5d obliquely extending from the base 10b as the intersection part of the second connection part 3b and the fourth drive vibrating arm 4d toward the third quadrant at an angle of 30 degrees with respect to the X-axis.

Note that the width of the base part 2 along the Y-axis may be equal to the width of the second connection part 3b along the Y-axis.

Further, the gyro element 1 has a first detection vibrating arm 6a extending from the base part 2 in the Y (+)-axis direction and a second detection vibrating arm 6b extending from the base part 2 in the Y (−)-axis direction. All of these respective arms have rectangular sections.

Furthermore, the first drive vibrating arm 4a, the second drive vibrating arm 4b, the third drive vibrating arm 4c, and the fourth drive vibrating arm 4d respectively have drive signal electrodes 7 for excitation of drive vibrations of the respective arms, and the first drive detection vibrating arm 5a, the second drive detection vibrating arm 5b, the third drive detection vibrating arm 5c, and the fourth drive detection vibrating arm 5d respectively have drive detection signal electrodes 8 for excitation of drive vibrations of the respective arms and detection of physical quantities of angular velocities or the like applied to the gyro element 1. In addition, the first detection vibrating arm 6a and the second detection vibrating arm 6b have detection signal electrodes 9 for detection of a physical quantity of angular velocities or the like applied to the gyro element 1.

In the gyro element 1 having the configuration, when voltages are applied to the drive signal electrodes 7, the first drive vibrating arm 4a, the second drive vibrating arm 4b, the third drive vibrating arm 4c, and the fourth drive vibrating arm 4d flexurally vibrate. The drive detection signal electrodes 8 have drive signal electrodes and detection signal electrodes, which will be described later with reference to FIG. 4B, and, when voltages are applied to the drive detection signal electrodes 8, the first drive detection vibrating arm 5a, the second drive detection vibrating arm 5b, the third drive detection vibrating arm 5c, and the fourth drive detection vibrating arm 5d flexurally vibrate. Then, the drive detection signal electrodes 8 detect a physical quantity of an angular velocity or the like around the X-axis or the Y-axis applied to the gyro element 1. On the other hand, the detection signal electrodes 9 of the first detection vibrating arm 6a and the second detection vibrating arm 6b detect a physical quantity of an angular velocity or the like around the Z-axis. Note that it has been already known that, in the gyro element with the first drive vibrating arm 4a, the second drive vibrating arm 4b, the third drive vibrating arm 4c, the fourth drive vibrating arm 4d, the first detection vibrating arm 6a, and the second detection vibrating arm 6b but without the obliquely extending first drive detection vibrating arm 5a, second drive detection vibrating arm 5b, third drive detection vibrating arm 5c, and fourth drive detection vibrating arm 5d, the physical quantity of the angular velocity or the like around the Z-axis is detected by the detection signal electrodes 9.

Further, the first drive detection vibrating arm 5a vibrating in the same phase as that of the first drive vibrating arm 4a vibrates in the opposite phase to that of the second drive detection vibrating arm 5b vibrating in the same phase as that of the second drive vibrating arm 4b. When the first drive detection vibrating arm 5a is flexed toward the X-axis side, the second drive detection vibrating arm 5b is also flexed toward the X-axis side, and, when the first drive detection vibrating arm 5a is flexed away from the X-axis side, the second drive detection vibrating arm 5b is also flexed away from the X-axis side. Similarly, the third drive detection vibrating arm 5c vibrating in the same phase as that of the third drive vibrating arm 4c vibrates in the opposite phase to that of the fourth drive detection vibrating arm 5d vibrating in the same phase as that of the fourth drive vibrating arm 4d.

Figure 8A:
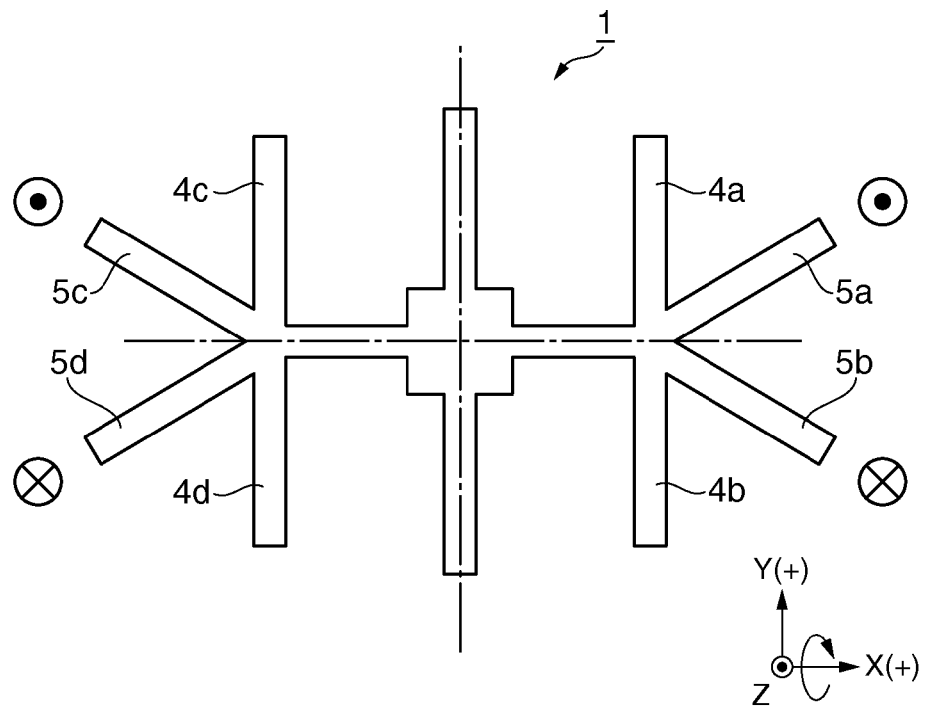
FIG. 8A is a plan view showing detection of an angular velocity around an X-axis in the gyro element.
Figure 8B:
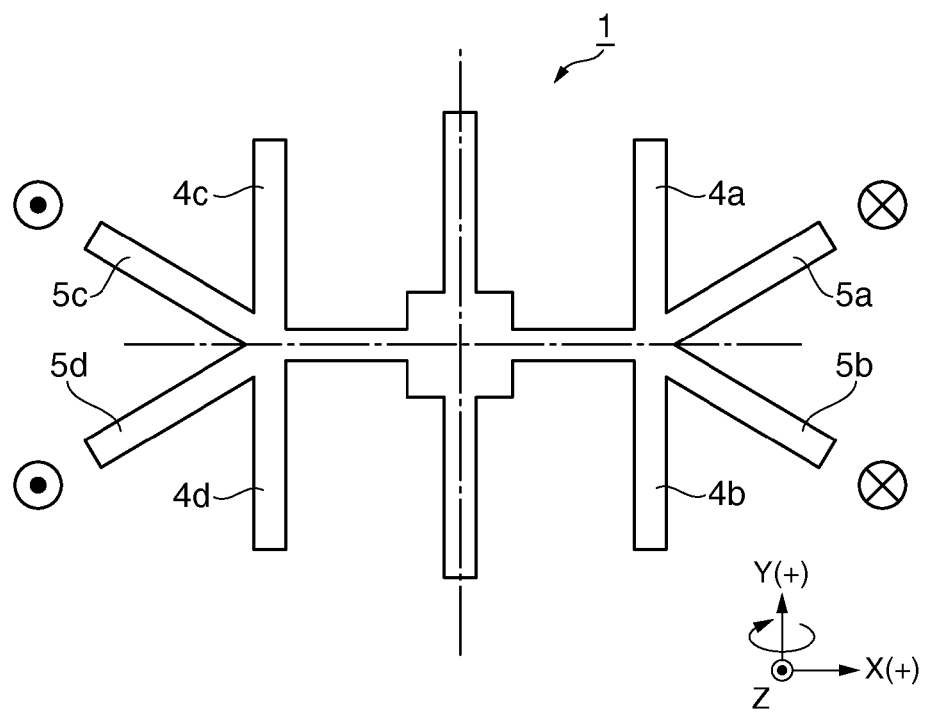
FIG. 8B is a plan view showing detection of an angular velocity around a Y-axis in the gyro element.

Note that the operation principle of physical quantity detection by the gyro element 1 will be described with reference to FIGS. 8A and 8B.

A major effect of the above described gyro element 1 (physical quantity detection element) in Embodiment 1 will be described. The gyro element 1 has the obliquely extending first drive detection vibrating arm 5a, second drive detection vibrating arm 5b, third drive detection vibrating arm 5c, and fourth drive detection vibrating arm 5d in addition to the first drive vibrating arm 4a, the second drive vibrating arm 4b, the third drive vibrating arm 4c, the fourth drive vibrating arm 4d, the first detection vibrating arm 6a, and the second detection vibrating arm 6b orthogonal to the X-axis. Thus, for example, stress in the base 10a due to the first drive vibrating arm 4a contributes to excitation of the first drive detection vibrating arm 5a and stress in the base 10a due to the second drive vibrating arm 4b contributes to excitation of the second drive detection vibrating arm 5b, and thereby, the respective connectivity is improved. Further, in the base 10b, the connectivity is similarly improved. Accordingly, the gyro element 1 may suppress leakage of vibration energy toward the base part 2 and reduce impedance as a vibrating reed with the higher Q-value.

Furthermore, the gyro element 1 has higher connectivity in the bases 10a, 10b, and thus, for example, when vibrations of the first drive vibrating arm 4a and the second drive vibrating arm 4b are excited by a driver circuit, the stress of the first drive vibrating arm 4a and the second drive vibrating arm 4b in the bases 10a, 10b becomes easier to contribute to excitation of the first drive detection vibrating arm 5a and the second drive detection vibrating arm 5b. Since the first drive vibrating arm 4a and the second drive detection vibrating arm 5b form an angle of 120 degrees and the second drive vibrating arm 4b and the first drive detection vibrating arm 5a form an angle of 120 degrees, it may be also said that the connectivity is higher in view of the above described crystal structure of the crystal. Further, in this case, using the piezoelectric single-crystal material of the hexagonal crystal having the three X axes with equal interior angles of 120 degrees, for example, the crystal z plate, the element having an arm configuration like that of the gyro element 1 may be easily formed. Furthermore, the gyro element 1 having the configuration with high connectivity may form a system using one driver circuit for obtaining vibration modes in two directions, and has an advantageous configuration in reduction in size and cost.

Embodiment 2

Figure 2:
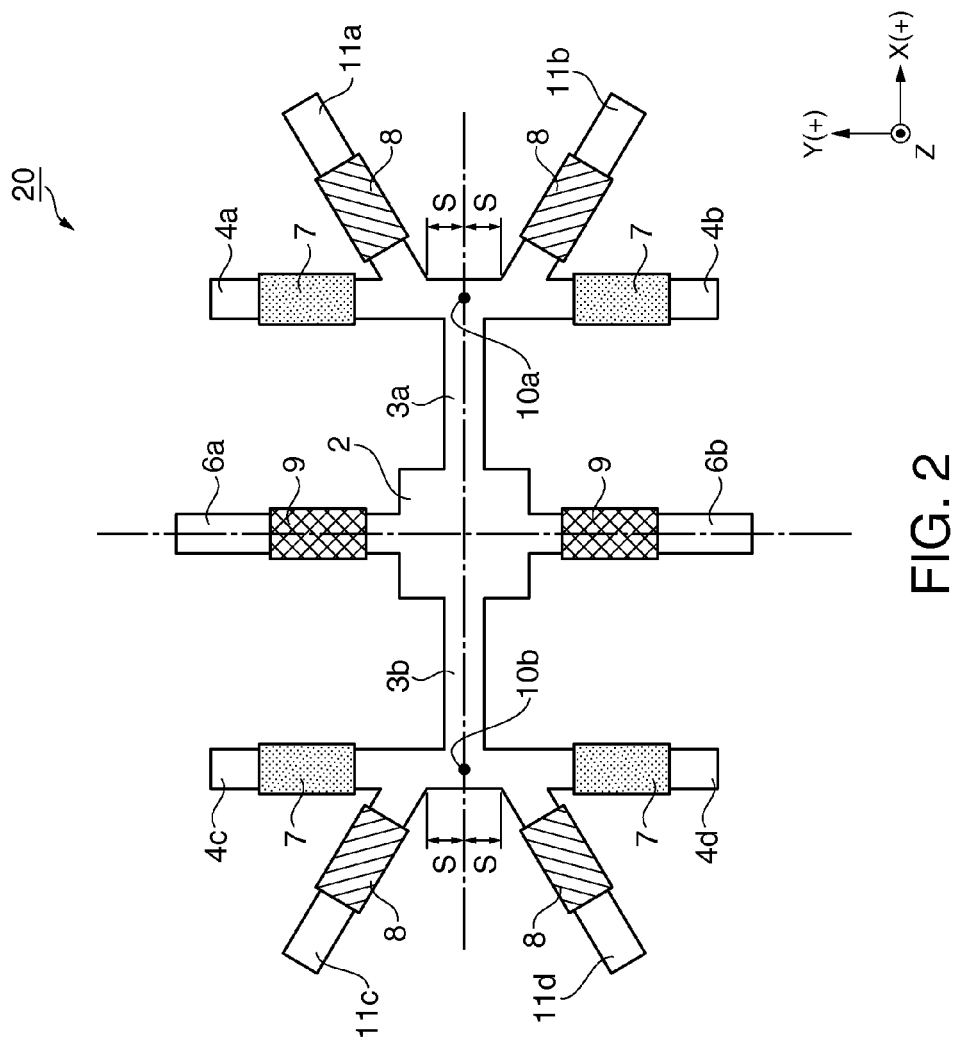
FIG. 2 is a plan view showing a configuration of a gyro element in Embodiment 2.

Next, another embodiment of the gyro element will be explained. FIG. 2 is a plan view showing a configuration of a gyro element in Embodiment 2. A gyro element 20 in Embodiment 2 is different from the gyro element 1 in embodiment 1 in extension positions of a first drive detection vibrating arm 11a, a second drive detection vibrating arm 11b, a third drive detection vibrating arm 11c, and a fourth drive detection vibrating arm 11d. On the other hand, the function of the gyro element 20 is nearly the same as that of the gyro element 1, and the other parts than the different parts have the same signs and their explanation will be omitted.

As shown in FIG. 2, the gyro element 20 has the same base part 2, first connection part 3a, second connection part 3b, first drive vibrating arm 4a, second drive vibrating arm 4b, third drive vibrating arm 4c, fourth drive vibrating arm 4d, first detection vibrating arm 6a, and second detection vibrating arm 6b as those of the gyro element 1 in Embodiment 1.

Further, in the gyro element 20, the first drive detection vibrating arm 11a obliquely extends from the first drive vibrating arm 4a and the extension position is a position at a distance s away from the base 10a in the Y(+)-axis direction. Further, the extension direction of the first drive detection vibrating arm 11a is the same as that of the first drive detection vibrating arm 5a in Embodiment 1 toward the first quadrant at an angle of 30 degrees with respect to the X-axis. Similarly, the second drive detection vibrating arm 11b obliquely extends from a position at a distance s away from the base 10a in the Y(−)-axis direction and its extension direction is the same as that of the second drive detection vibrating arm 5b in Embodiment 1 toward the fourth quadrant, the third drive detection vibrating arm 11c obliquely extends from a position at a distance s away from the base 10b in the Y(+)-axis direction and its extension direction is the same as that of the third drive detection vibrating arm 5c in Embodiment 1 toward the second quadrant, and the fourth drive detection vibrating arm 11d obliquely extends from a position at a distance s away from the base 10b in the Y(−)-axis direction and its extension direction is the same as that of the fourth drive detection vibrating arm 5d in Embodiment 1 toward the third quadrant.

In the gyro element 20 having the configuration, the first drive detection vibrating arm 11a and the second drive detection vibrating arm 11b are not formed on the extension when the first connection part 3a extending from the base part 2 is extended in the X(+) direction as it is. That is, the first drive detection vibrating arm 11a and the second drive detection vibrating arm 11b do not extend from the position of the base 10a, but may improve connectivity to the first drive vibrating arm 4a or the second drive vibrating arm 4b separately from the first connection part 3a. Similarly, the third drive detection vibrating arm 11c and the fourth drive detection vibrating arm 11d may improve connectivity to the third drive vibrating arm 4c or the fourth drive vibrating arm 4d separately from the second connection part 3b. Thereby, the gyro element 20 can nearly completely suppress leakage vibration from the first drive vibrating arm 4a to the fourth drive vibrating arm 4d and the first drive detection vibrating arm 11a to the fourth drive detection vibrating arm 11d toward the base part 2 via the first connection part 3a or the second connection part 3b.

Embodiment 3

Figure 3:
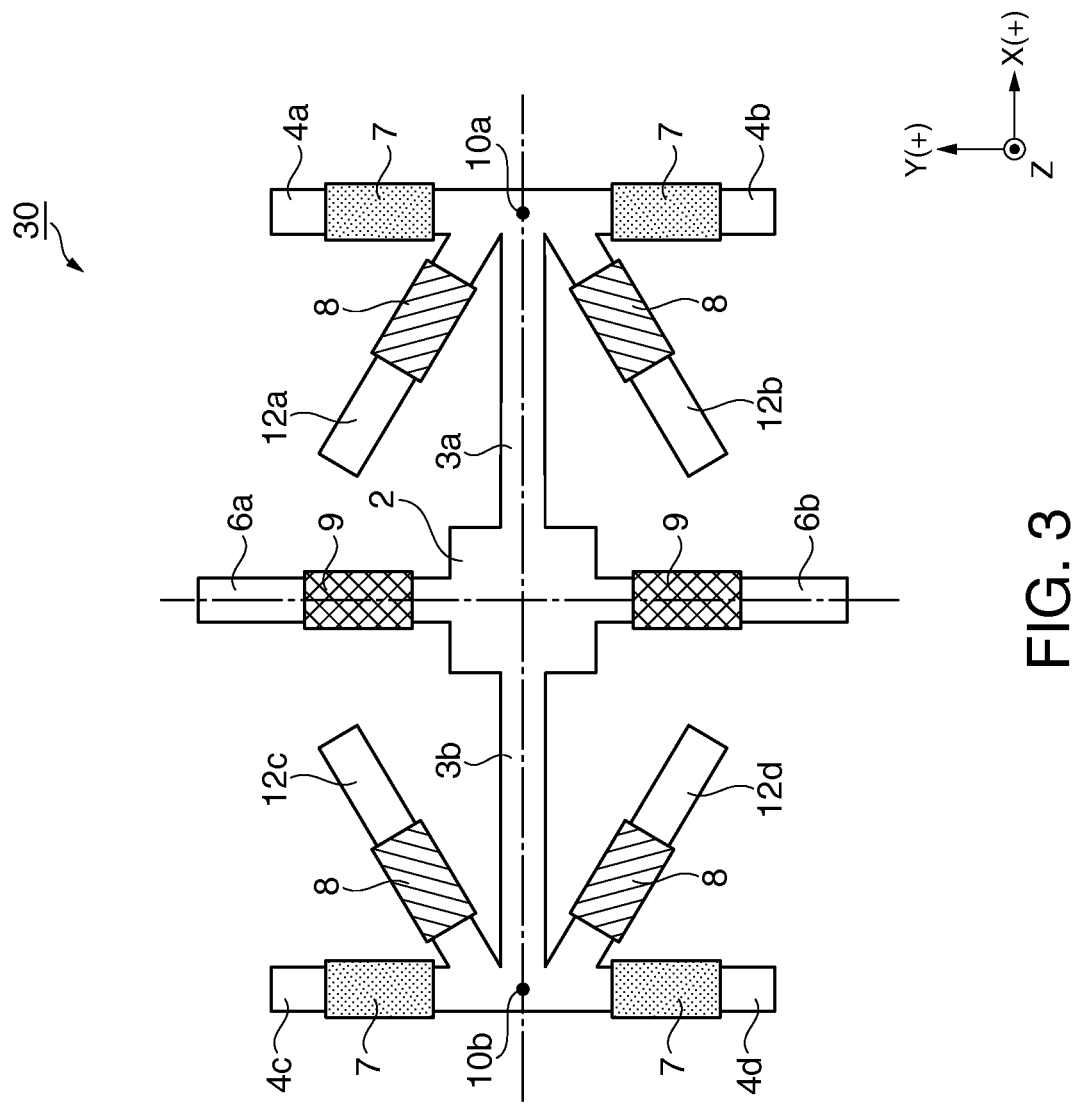
FIG. 3 is a plan view showing a configuration of a gyro element in Embodiment 3.

Next, another embodiment of the gyro element will be explained. FIG. 3 is a plan view showing a configuration of a gyro element in Embodiment 3. A gyro element 30 in Embodiment 3 is different from the gyro element 1 in embodiment 1 in extension directions of a first drive detection vibrating arm 12a, a second drive detection vibrating arm 12b, a third drive detection vibrating arm 12c, and a fourth drive detection vibrating arm 12d. On the other hand, the function of the gyro element 30 is nearly the same as that of the gyro element 1, and the other parts than the different parts have the same signs and their explanation will be omitted.

As shown in FIG. 3, the gyro element 30 has the same base part 2, first connection part 3a, second connection part 3b, first drive vibrating arm 4a, second drive vibrating arm 4b, third drive vibrating arm 4c, fourth drive vibrating arm 4d, first detection vibrating arm 6a, and second detection vibrating arm 6b as those of the gyro element 1 in Embodiment 1.

Further, in the gyro element 30, the first drive detection vibrating arm 12a obliquely extends from the base 10a as the intersection part of the first connection part 3a and the first drive vibrating arm 4a toward the second quadrant, i.e., in a direction different from that of the first drive detection vibrating arm 5a in Embodiment 1 at an angle of 30 degrees with respect to the X-axis. Further, the second drive detection vibrating arm 12b obliquely extends from the base 10a toward the third quadrant, i.e., in a direction different from that of the second drive detection vibrating arm 5b in Embodiment 1 at an angle of 30 degrees with respect to the X-axis, the third drive detection vibrating arm 12c obliquely extends from the base 10b as the intersection part of the second connection part 3b and the third drive vibrating arm 4c toward the first quadrant, i.e., in a direction different from that of the third drive detection vibrating arm 5c in Embodiment 1 at an angle of 30 degrees with respect to the X-axis, and the fourth drive detection vibrating arm 12d obliquely extends from the base 10b toward the fourth quadrant, i.e., in a direction different from that of the fourth drive detection vibrating arm 5d in Embodiment 1 at an angle of 30 degrees with respect to the X-axis.

In the gyro element 30 having the configuration, the first drive detection vibrating arm 12a to the fourth drive detection vibrating arm 12d obliquely extend toward the base part 2, i.e., inside to the side of the first detection vibrating arm 6a or the second detection vibrating arm 6b. With the configuration in which the first drive detection vibrating arm 12a to the fourth drive detection vibrating arm 12d extend in the direction, the gyro element 30 may be made smaller than in the case where they extend toward outside as in Embodiments 1 and 2.

Figure 4A:
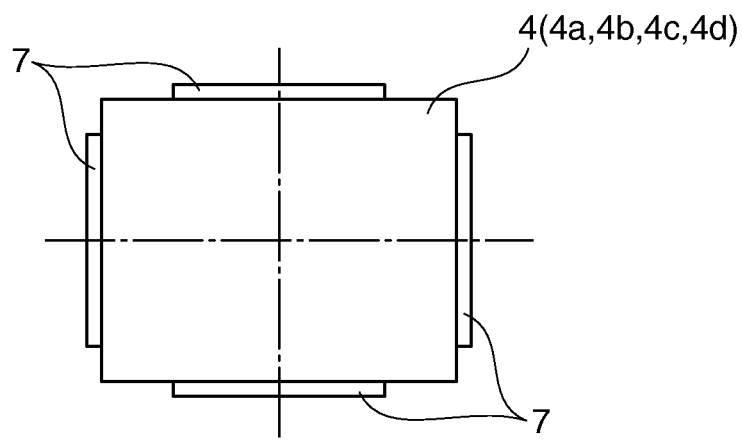
FIGS. 4A and 4B are sectional views showing electrode configurations of the gyro element.
Figure 4B:
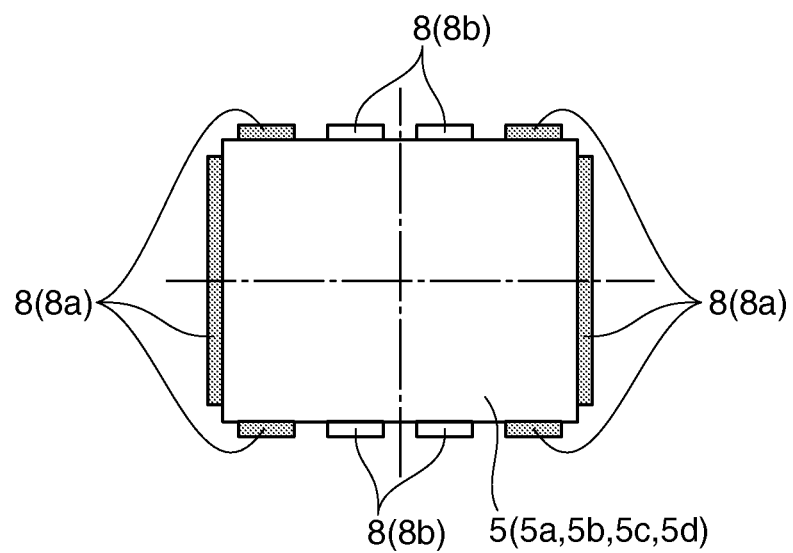

The gyro elements 1, 20, 30 having the various vibrating arm configurations have been explained as above. Next, the signal electrodes of the gyro elements 1, 20, 30 will be explained. The signal electrodes are provided on the vibrating arms for vibrating the vibrating arms or detecting physical quantities. FIGS. 4A and 4B are sectional views showing electrode configurations of the gyro element.

FIG. 4A shows the drive signal electrodes 7 provided on the drive vibrating arm 4 (the first drive vibrating arm 4a, the second drive vibrating arm 4b, the third drive vibrating arm 4c, the fourth drive vibrating arm 4d) in a sectional view in which the drive vibrating arm 4 is cut in parallel to the X-axis. The section of the drive vibrating arm 4 has a square shape (rectangular shape) and the drive signal electrodes 7 are provided on the respective surfaces. It is necessary that these drive signal electrodes 7 have electrical conductivity, and in this case, the electrodes include metal films having two layers of a Cr film and an Au film and are formed by evaporation such as sputtering, etching, or the like.

The drive signal electrodes 7 include two sets of drive signal electrodes 7 with the two opposed electrodes in parallel to the X-Y plane at the same potential and the other two opposed electrodes at the same potential, and alternating currents are applied from the one set of drive signal electrodes 7 to the other set of drive signal electrodes 7. Electric fields are generated by application of the alternating currents, and the drive vibrating arm 4 can vibrate within the X-Y plane as shown in FIG. 1.

Note that, though not illustrated, the detection signal electrodes 9 (FIG. 1) formed to have the same configuration as that of the drive signal electrodes 7 of the drive vibrating arm 4 are provided on the first detection vibrating arm 6a and the second detection vibrating arm 6b. These detection signal electrodes 9 fulfill a function of detecting a physical quantity of an angular velocity or the like around the Z-axis applied to the gyro element 1 as described above.

Further, FIG. 4B shows the drive detection signal electrodes 8 provided on the drive detection vibrating arm 5 (the first drive detection vibrating arm 5a, the second drive detection vibrating arm 5b, the third drive detection vibrating arm 5c, and the fourth drive detection vibrating arm 5d) in a sectional view cut at a right angle with respect to the extension direction of the drive detection vibrating arm 5. The section of the drive detection vibrating arm 5 has a square shape (rectangular shape) and the drive detection signal electrodes 8 are provided on the respective surfaces. Here, the drive detection signal electrode 8 includes drive signal electrodes 8a and detection signal electrodes 8b. Further, the drive signal electrodes 8a are respectively provided in both corner parts on the two surfaces (parallel surfaces) in parallel to the X-Y plane in the drive detection vibrating arm 5, and the detection signal electrodes 8b are provided in a pair in the center part sandwiched between the two drive signal electrodes 8a. Furthermore, the drive signal electrodes 8a are separately provided on the other two surfaces (other surfaces).

The drive detection vibrating arm 5 can vibrate within the X-Y plane as shown in FIG. 1 by application of alternating currents from the drive signal electrodes 8a on the other surfaces to the drive signal electrodes 8a on the parallel surfaces. The drive detection vibrating arm 5 has the drive signal electrodes 8a, and thus, for example, the first drive detection vibrating arm 5a is excited by the stress of the first drive vibrating arm 4a in the base 10a but also vibrated by the drive signal electrodes 8a, and thereby, the vibration amplitude may be made larger. Further, the detection signal electrodes 8b fulfill a function of detecting a physical quantity of an angular velocity or the like around the X-axis or the Y-axis applied to the gyro element 1 as described above. Note that, in the gyro elements 20, 30, the first drive detection vibrating arm 11a to the fourth drive detection vibrating arm 11d and the first drive detection vibrating arm 12a to the fourth drive detection vibrating arm 12d have the same drive detection signal electrodes 8 as those of the drive detection vibrating arm 5.

Embodiment 4

Figure 5A:
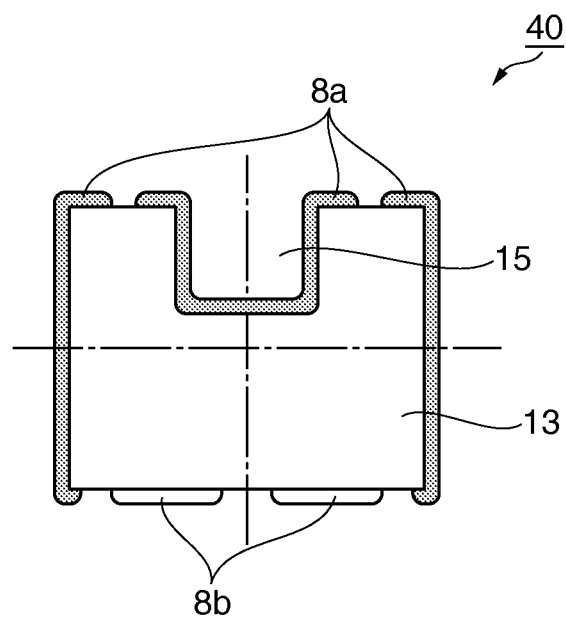
FIG. 5A is a sectional view showing a groove part provided in a drive detection vibrating arm of a gyro element in Embodiment 4.

Next, another embodiment of the gyro element will be explained. FIG. 5A is a sectional view showing a groove part provided in a drive detection vibrating arm of a gyro element in Embodiment 4. In a gyro element 40 here, only the sectional shape of a drive detection vibrating arm 13 is different from the drive detection vibrating arm 5 of the gyro element 1. Note that signal electrodes provided on the drive detection vibrating arm 13 have the same signs as those of the drive detection signal electrodes 8 (the drive signal electrodes 8a and the detection signal electrodes 8b), and corner parts refer to parts in four corner positions at the outer periphery in the section of the drive detection vibrating arm 13.

As shown in FIG. 5A, the drive detection vibrating arm 13 has a section in a square shape (rectangular shape), two surfaces (parallel surfaces) in parallel to the X-Y plane (FIG. 1) and other two surfaces (other surface), and a groove part 15 in one of the parallel surfaces. The groove part 15 is provided in the center position of the parallel surface provided along the extension direction of the drive detection vibrating arm 13. The drive detection vibrating arm 13 has drive signal electrodes 8a including regions respectively formed from the entire surfaces of both of the other surfaces to vicinities of the corner parts of the parallel surface provided with the groove part 15 and a region formed from the groove part 15 to vicinities of both corner parts of the parallel surface. Further, the parallel surface without the groove part 15 of the drive detection vibrating arm 13 has detection signal electrodes 8b provided in a pair at the center thereof.

The drive detection vibrating arm 13 has the groove part 15, and thus, the regions of the drive signal electrodes 8a become broader and electric field intensity may be made higher. Thereby, in the drive detection vibrating arm 13, the vibration amplitude may be made larger than that in the drive detection vibrating arms 5, 11, 12, and the effect of improving the accuracy of physical quantity detection by the detection signal electrodes 8b may be exerted.

Figure 5B:
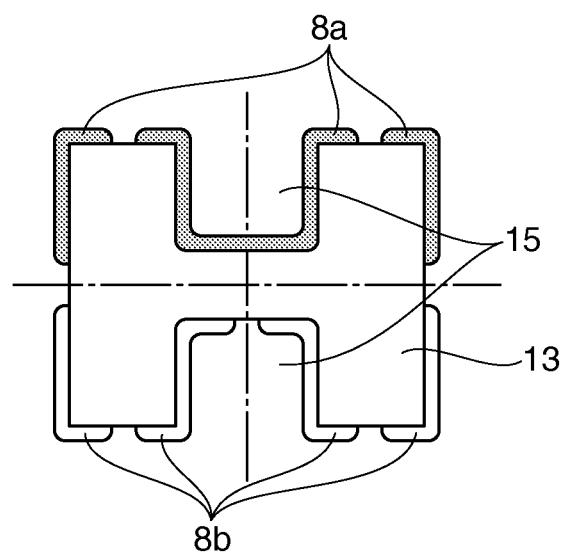
FIG. 5B is a sectional view showing another form of the groove part provided in the drive detection vibrating arm.
Figure 6A:
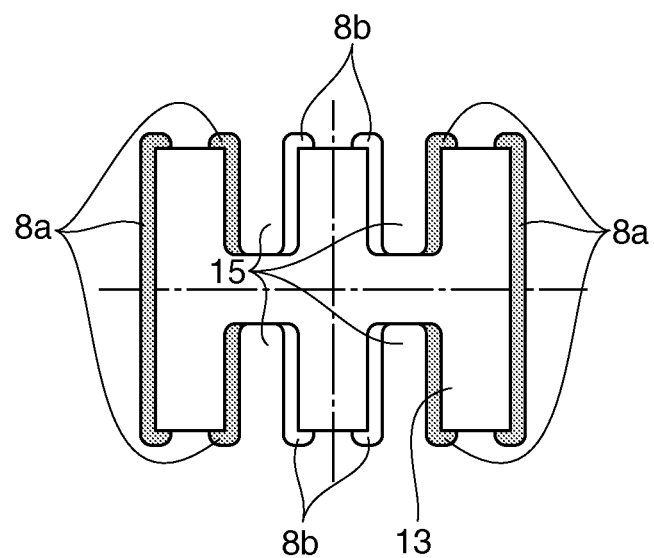
FIGS. 6A and 6B are sectional views showing other forms of the groove part provided in the drive detection vibrating arm.
Figure 6B:
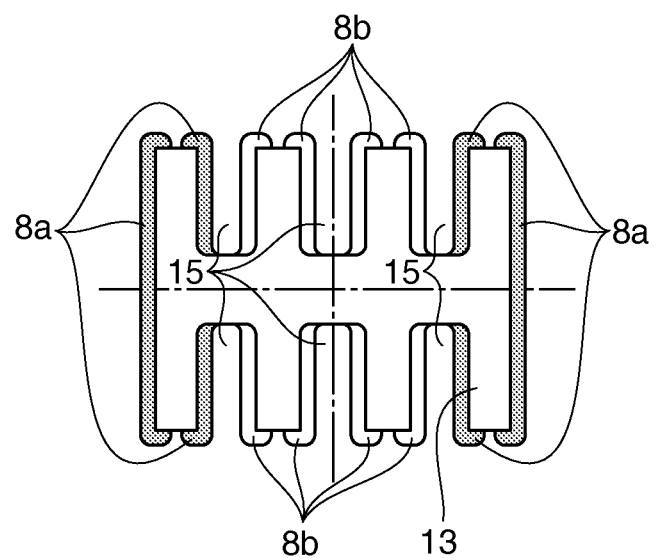

In addition, for the groove part 15 provided in the drive detection vibrating arm 13, not only the form shown in FIG. 5A but also the following form is conceivable. FIG. 5B is a sectional view showing another form of the groove part provided in the drive detection vibrating arm, and FIGS. 6A and 6B are sectional view showing other forms of the groove part provided in the drive detection vibrating arm. FIGS. 5B, 6A, and 6B show the forms using the groove parts 15 and the drive detection signal electrodes 8 (the drive signal electrodes 8a and the detection signal electrodes 8b) like FIG. 5A.

The drive detection vibrating arm 13 as shown in FIG. 5B has groove parts 15 respectively on both surfaces of the two surfaces in parallel to the X-Y plane (FIG. 1). These groove parts 15 are respectively provided in the center positions of the parallel surfaces along the extension direction of the drive detection vibrating arm 13. In this case, the drive signal electrodes 8a include a region formed from the entire of one groove part 15 to the parallel surface near both corner parts and regions respectively formed from the parallel surface near both corner parts over parts of the other surfaces. Further, the detection signal electrodes 8b are formed with a region from one half of the section of the other groove part 15 to a part of the parallel surface and a region from the other surface opposed to the half of the section to the parallel surface near the corner part in a pair and a region from the other half of the section of the groove part 15 to a part of the parallel surface and a region from the other surface opposed to the other half of the section to the parallel surface near the corner part in a pair.

Furthermore, the drive detection vibrating arm 13 as shown in FIG. 6A has two groove parts 15 respectively on both surfaces of two surfaces (parallel surfaces) in parallel to the X-Y plane (FIG. 1). In this case, drive signal electrodes 8a have a part formed in three regions of a region from the entire surface of one of the other surfaces to the parallel surface near both corner parts and regions of halves of the respective sections of the two groove parts 15 opposed to the one of the other surfaces, and similarly, a part formed in three regions of regions of halves of the respective sections of the two groove parts 15 of the other of the other surfaces and opposed to the other of the other surfaces. Further, detection signal electrodes 8b are formed in opposed parts of the sections without the drive signal electrodes 8a in the two groove parts 15 at one parallel surface side in a pair, and similarly, formed in the two groove parts 15 at the other parallel surface side in a pair, and thereby, form two pairs.

In addition, the drive detection vibrating arm 13 as shown in FIG. 6B has three groove parts 15 respectively on both surfaces of the two surfaces (parallel surfaces) in parallel to the X-Y plane (FIG. 1). In this case, drive signal electrodes 8a have a part formed in three regions of a region from the entire surface of one of the other surfaces to the parallel surface near both corner parts and regions of halves of the respective sections of the two groove parts 15 opposed to the one of the other surfaces, and similarly, a part formed in three regions of regions of the other of the other surfaces and halves of the respective sections of the two groove parts 15 opposed to the other of the other surfaces. Further, detection signal electrodes 8b are formed likewise in the case of FIG. 6A, and thereby, form four pairs.

Regarding these drive detection vibrating arms 13, as the increase in groove parts 15, the electric field intensity may be made higher by increasing the surface area of the drive detection vibrating arms 13 and the accuracy of physical quantity detection by the detection signal electrodes 8b may be improved.

Figure 7A:
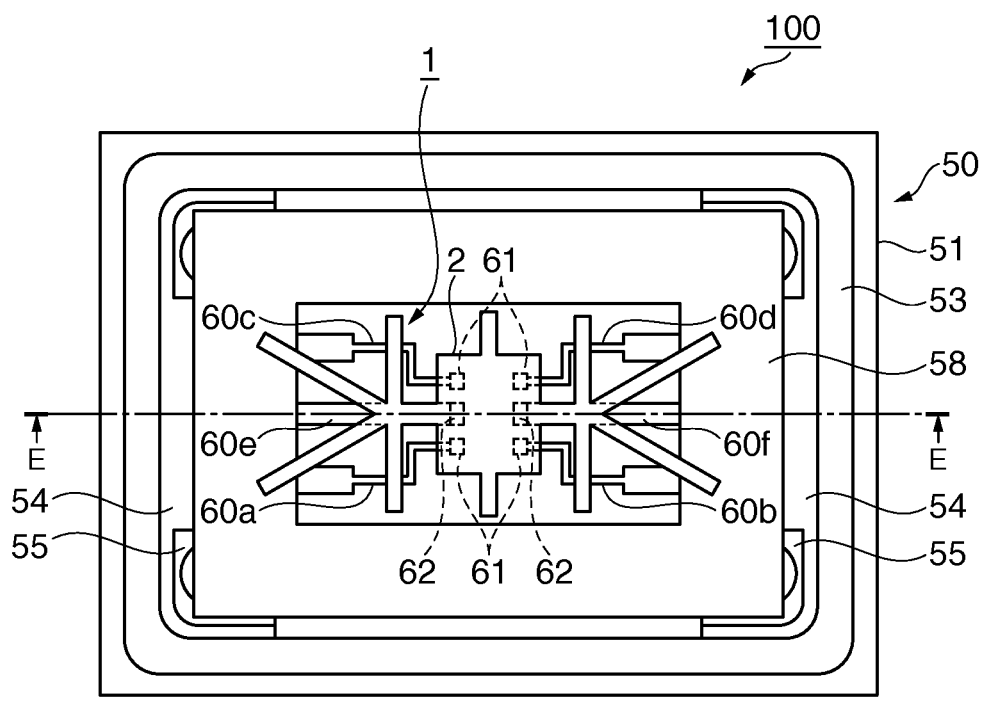
FIG. 7A is a plan view showing a gyro device including the gyro element.
Figure 7B:
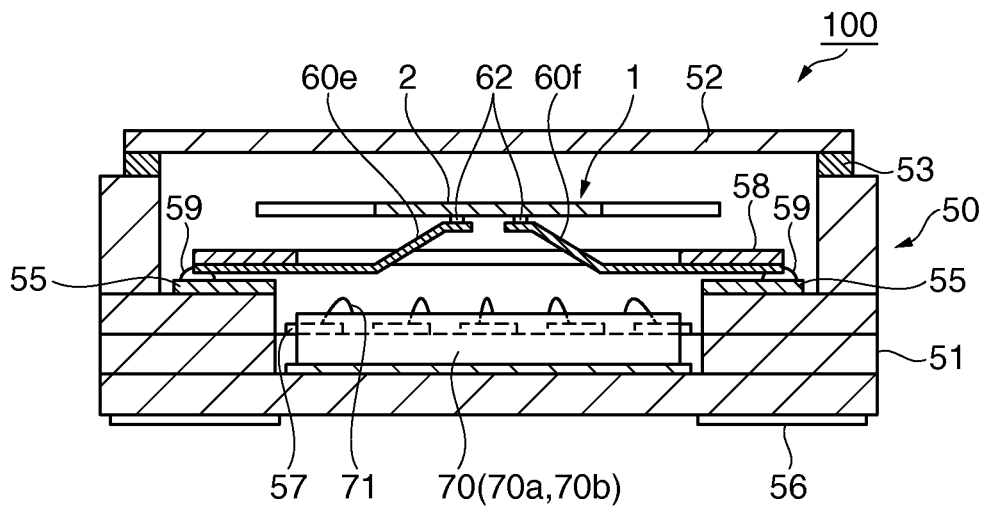
FIG. 7B is a sectional view showing the gyro device including the gyro element.

Next, a configuration of a gyro device (physical quantity detection device) of detecting an angular velocity using one of the gyro elements 1, 20, 30, 40 will be explained. FIG. 7A is a plan view showing a gyro device including the gyro element. Further, FIG. 7B is a sectional view showing the gyro device including the gyro element in E-E section in FIG. 7A. In this case, FIGS. 7A and 7B show a gyro device 100 including the gyro element 1, and a lid body 52 is omitted for explanation in FIG. 7A.

As shown in FIGS. 7A and 7B, the gyro device 100 includes the gyro element 1, a support substrate 58 that supports the gyro element 1 via leads 60 (60a, 60b, 60c, 60d, 60e, 60f), a ceramic package 50 having a container 51 as a fixing substrate that fixes the support substrate 58, an IC (Integrated Circuit) chip 70, and the lid body 52 for air-tightly sealing within the container 51. The IC chip 70 held in the ceramic package 50 is connected to bonding pads 57 of the ceramic package 50 by metal wires 71 such as gold wires. The IC chip 70 includes a driver circuit 70a that supplies a drive signal and excites the gyro element 1, a detector circuit 70b that detects a physical quantity of an angular velocity or the like, etc.

Further, ledge parts 54 are formed in the container 51 in the ceramic package 50, and connection terminals 55 are formed on the surfaces thereof. The support substrate 58 is bonded and fixed to the ledge parts 54 and a conducting adhesive 59 is used for the bonding and fixing. Furthermore, an external connection terminal 56 is formed in the outer peripheral part of the ceramic package 50 for conduction between the external connection terminal 56 and parts of the connection terminals 55 and the bonding pads 57. In addition, the leads 60 (60a, 60b, 60c, 60d, 60e, 60f) are provided on the support substrate 58, and the ends of the leads 60a, 60b, 60c, 60d are respectively bonded to corresponding pads of detection electrode pads 61 formed in the base part 2 of the gyro element 1, and the ends of the leads 60e, 60f are respectively bonded to corresponding pads of drive electrode pads 62 formed in the base part 2 of the gyro element 1. By the leads 60, the gyro element 1 is supported in the air without contact with other parts. Note that the detection electrode pads 61 are for detection of detection vibrations and the drive electrode pads 62 are for excitation of drive vibrations. In the ceramic package 50 having the configuration, a seam ring 53 is fixed to the container 51, the lid body 52 is seam-welded to the seam ring 53, and thereby, the ceramic package 50 is sealed in a decompressed condition. Note that, within the ceramic package 50, an inertia gas such as nitrogen, helium, or argon may be enclosed, not decompressed.

Here, the support substrate 58 uses a substrate for TAB (Tape Automated Bonding) mounting, and has a conductor pattern formed by a metal foil such as a copper foil on a base material of a polyimide film or the like. The center part of the support substrate 58 is opened and the leads 60 as the conductor pattern extend out of the opening. The ends of the leads 60 opposite to the detection electrode pads 61 or the drive electrode pads 62 are connected to the connection terminals 55 of the ceramic package 50. The gyro device 100 is mounted on an electronic apparatus, which will be described later, or the like, for example, and fulfills an advantageous gyro function. Note that, as the gyro device, not only the configuration including the gyro element 1 but also one including any of the gyro elements 20, 30, 40 fulfills nearly the same advantageous gyro function.

Next, the operation principle of the gyro elements 1, 20, 30, 40 in Embodiments 1 to 4 will be explained. The explanation of the operation principle here will be made by taking the case of the gyro element 1, and detection of an angular velocity (physical quantity) with respect to the Z-axis that has been known will be omitted and detection of angular velocities (physical quantities) with respect to the X-axis and the Y-axis will be explained. FIG. 8A is a plan view showing detection of an angular velocity around the X-axis in the gyro element, and FIG. 8B is a plan view showing detection of an angular velocity around the Y-axis in the gyro element.

First, with reference to FIG. 8A, the detection of the angular velocity around the X-axis will be explained. The first drive vibrating arm 4a and the first drive detection vibrating arm 5a of the gyro element 1 vibrate in opposite phases to the second drive vibrating arm 4b and the second drive detection vibrating arm 5b as described above. Similarly, the third drive vibrating arm 4c and the third drive detection vibrating arm 5c vibrate in opposite phases to the fourth drive vibrating arm 4d and the fourth drive detection vibrating arm 5d. Under the condition, when the gyro element 1 is rotated around the X-axis, a Coriolis force in the Z-axis direction acts on the first drive detection vibrating arm 5a and the third drive detection vibrating arm 5c and the arms perform detection vibrations in the Z-axis direction. Similarly, a Coriolis force in the opposite Z-axis direction to the first drive detection vibrating arm 5a and the third drive detection vibrating arm 5c acts on the second drive detection vibrating arm 5b and the fourth drive detection vibrating arm 5d, and the arms perform detection vibrations in the Z-axis direction. That is, the first drive detection vibrating arm 5a and the third drive detection vibrating arm 5c, and the second drive detection vibrating arm 5b and the fourth drive detection vibrating arm 5d perform detection vibrations in different phases from each other. In the gyro element 1, by calculating the sum of the detection signals based on the respective detection vibrations of the first drive detection vibrating arm 5a and the third drive detection vibrating arm 5c, further calculating the sum of the detection signals based on the respective detection vibrations of the second drive detection vibrating arm 5b and the fourth drive detection vibrating arm 5d, and taking difference between those sums, the magnitudes of the Coriolis forces may be known. That is, the magnitude of the angular velocity (physical quantity) around the X-axis applied to the gyro element 1 may be recognized.

Next, with reference to FIG. 8B, the detection of the angular velocity around the Y-axis will be explained. Under the condition that the gyro element 1 vibrates, when the gyro element 1 is rotated around the Y-axis, a Coriolis force in the Z-axis direction acts on the first drive detection vibrating arm 5a and the second drive detection vibrating arm 5b and detection vibrations in the Z-axis direction are generated. A Coriolis force in the opposite Z-axis direction to the first drive detection vibrating arm 5a and the second drive detection vibrating arm 5b acts on the third drive detection vibrating arm 5c and the fourth drive detection vibrating arm 5d, and detection vibrations in the Z-axis direction are generated. That is, the first drive detection vibrating arm 5a and the second drive detection vibrating arm 5b, and the third drive detection vibrating arm 5c and the fourth drive detection vibrating arm 5d perform detection vibrations in different phases from each other. In the gyro element 1, by calculating the sum of the detection signals based on the respective detection vibrations of the first drive detection vibrating arm 5a and the second drive detection vibrating arm 5b, further calculating the sum of the detection signals based on the respective detection vibrations of the third drive detection vibrating arm 5c and the fourth drive detection vibrating arm 5d, and taking difference between those sums, the magnitudes of the Coriolis forces may be known. That is, the magnitude of the angular velocity (physical quantity) around the Y-axis applied to the gyro element 1 may be recognized. As above, the operation principle has been explained by taking the gyro element 1 as an example, however, the angular velocities may be detected on the same principle in the gyro elements 20, 30, 40. The gyro elements 1, 20, 30, 40 are mounted on gyro devices and fulfill advantageous gyro functions.

Figure 9:
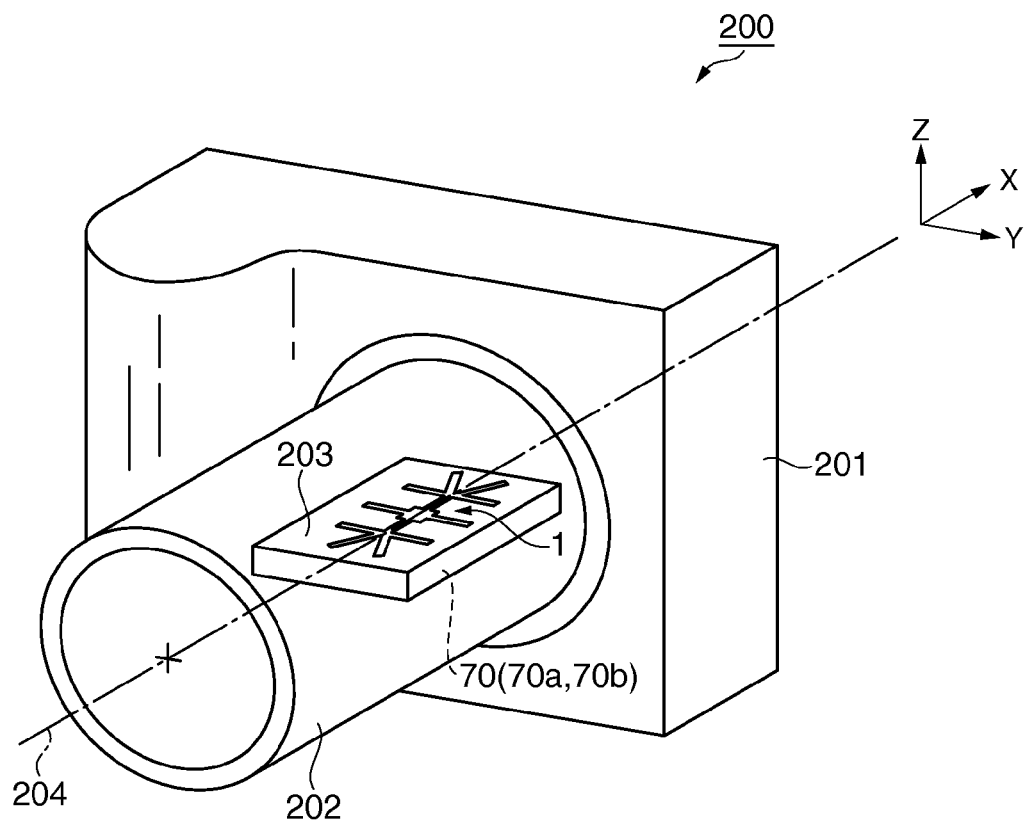
FIG. 9 is a perspective view showing a still camera including the gyro element provided in parallel to an optical axis.

Next, an electronic apparatus using any of the gyro elements 1, 20, 30, 40 will be explained. FIG. 9 is a perspective view showing a still camera including the gyro element provided in parallel to an optical axis. In this case, a still camera 200 is used by mounting an interchangeable lens 202 on a camera main body 201, and the interchangeable lens 202 includes an imaging system (not shown) inside. Here, the explanation will be made by providing coordinate axes having an X-axis of a lens optical axis 204 of the imaging system and a Y-axis in the horizontal direction. The interchangeable lens 202 of the still camera 200 has a substrate 203 and the substrate 203 is a hard substrate with circuit wiring formed in multiple layers and has a substrate surface in a nearly rectangular shape. Note that, in FIG. 9, for convenience of explanation, the substrate 203 etc. are seen from the outside, however, the actual substrate 203 is held within the interchangeable lens 202. The substrate 203 is mounted so that the substrate surface of the substrate 203 may be along with the X-axis, the lens optical axis 204 and in parallel to the Y-axis when the interchangeable lens 202 is mounted on the camera main body 201 and the camera main body 201 takes a position located on the X-Y plane, the horizontal surface in this case.

Generally, in the case of a still camera, when camera shake occurs around the axis perpendicular to the optical axis of the lens, images are greatly affected, however, compared to the camera shake around the axis perpendicular to the optical axis, images are less affected by camera shake around the optical axis. On this account, in related art, camera shake compensation has been performed using a gyro element that can detect angular velocities around two axes of the Y-axis and the Z-axis. Accordingly, in order to also detect the angular velocity around the X-axis, it has been necessary to add one more gyro element.

On the other hand, the still camera 200 includes the gyro element 1 that can detect angular velocities around three axes, provided in parallel to the substrate 203, and further includes the IC chip 70 having the driver circuit 70a and the detector circuit 70b for controlling the gyro element 1. The gyro element 1 is in the same arrangement as the coordinate arrangement in which the substrate 203 is mounted, and thereby, the still camera 200 may correct the camera shake nearly completely by detecting the angular velocities around three axes using only one gyro element 1, and its installation space may be minimized because the gyro element 1 is in parallel to the substrate 203. Further, the vibration directions of the first to fourth drive vibrating arms 4a to 4d are in parallel to the lens optical axis 204 of the interchangeable lens 202, and thus, even when acceleration in the Y-axis direction or the Z-axis direction is applied to the still camera 200, the vibrations of the first to fourth drive vibrating arms 4a to 4d are hardly affected by the acceleration and the vibrations are stable. Note that, if the gyro element 1 provided on the substrate 203 is the gyro element 20, 30, or 40, the same effects as those of the gyro element 1 may be obtained.

Figure 10A:
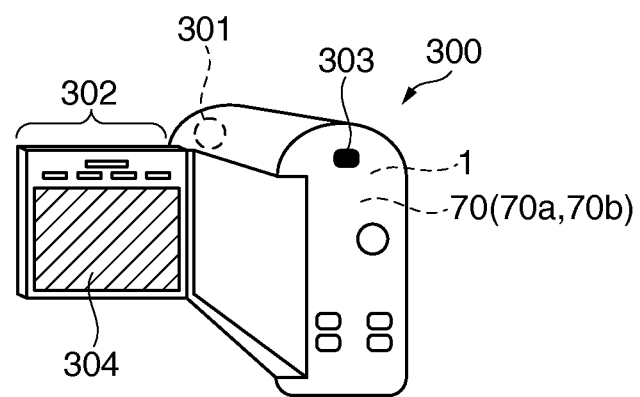
FIG. 10A is a perspective view showing a video camera including the gyro element.
Figure 10B:
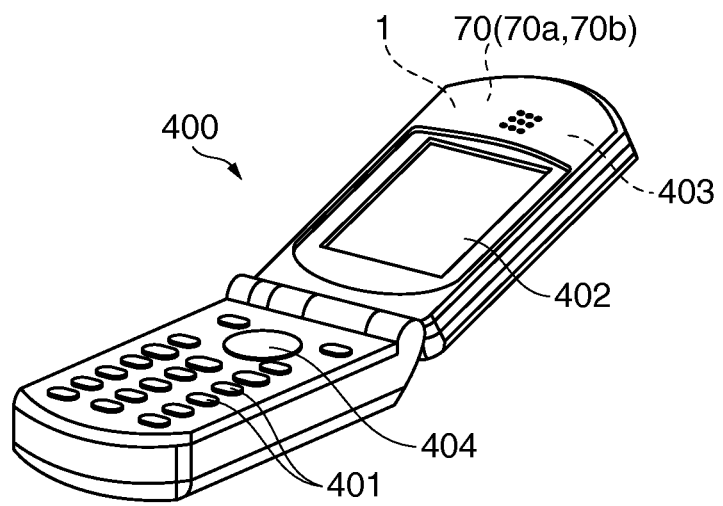
FIG. 10B is a perspective view showing a cellular phone including the gyro element.

Further, FIG. 10A is a perspective view showing a video camera including the gyro element, and FIG. 10B is a perspective view showing a cellular phone including the gyro element. First, as shown in FIG. 10A, a video camera 300 includes a receiver unit 301, an operation unit 302, an audio input unit 303, and a display unit 304. The video camera 300 includes the gyro element 1 and the IC chip 70 having the driver circuit 70a and the detector circuit 70b for controlling the gyro element 1, and may fulfill a camera shake compensation function by detecting angular velocities around three axes of the X-axis, the Y-axis, and the Z-axis and may record clear moving images. In this case, it is preferable that the gyro element 1 is in the form of the gyro device 100. Similarly, in the case where the video camera 300 includes the gyro element 20, 30, or 40, the camera may fulfill a camera shake compensation function by detecting angular velocities around three axes of the X-axis, the Y-axis, and the Z-axis.

Further, as shown in FIG. 10B, a cellular phone 400 includes operation buttons 401, a display unit 402, a camera mechanism 403, and a shutter button 404. The cellular phone 400 includes the gyro element 1 and the IC chip 70 having the driver circuit 70a and the detector circuit 70b for controlling the gyro element 1, and detects angular velocities around three axes of the X-axis, the Y-axis, and the Z-axis, and thereby, the camera mechanism 403 may fulfill a camera shake compensation function and record clear images. In this case, it is preferable that the gyro element 1 is in the form of the gyro device 100. Similarly, in the case where the cellular phone 400 includes the gyro element 20, 30, or 40, a camera shake compensation function may be fulfilled by detection of angular velocities around three axes of the X-axis, the Y-axis, and the Z-axis.

As the electronic apparatus, not limited to the still camera 200, the video camera 300 or the cellular phone 400, but a navigation system, a vehicle body position detector, a game controller, a head-mounted display, a pointing device, a cleaning robot, or the like may be cited.

Further, the gyro elements 1, 20, 30, 40 are not limited to the above described respective embodiments, but the same effects as those of the embodiments may be obtained by the following modified examples.

MODIFIED EXAMPLE 1

In the gyro element 1, the drive detection vibrating arm 5 (the first drive detection vibrating arm 5a, the second drive detection vibrating arm 5b, the third drive detection vibrating arm 5c, and the fourth drive detection vibrating arm 5d) has the drive signal electrode 8a and the detection signal electrodes 8b, however, not limited to the configurations. Like the first detection vibrating arm 6a and the second detection vibrating arm 6b having only the detection signal electrodes 9, the configurations having only the detection signal electrodes 8b may be employed. Note that the same configurations may be employed in the gyro elements 20, 30, 40.

MODIFIED EXAMPLE 2

In the gyro element 1, the drive detection vibrating arm 5 extends at the angle of 30 degrees with respect to the X-axis, however, other angles may be employed, not limited to the angles of 30 degrees. Specifically, if the angle with respect to the X-axis is 45 degrees, the drive components in the X-axis direction and the Y-axis direction in the drive detection vibrating arm 5 are the same, and the amplitudes of the detection signals around the X-axis and the Y-axis may be made nearly equal, and detection of physical quantities of angular velocities or the like becomes easier. The configuration may apply to the gyro elements 20, 30, 40.

MODIFIED EXAMPLE 3

In the gyro element 30, the first drive detection vibrating arm 12a to the fourth drive detection vibrating arm 12d may extend from positions at a distance s from the bases 10a, 10b like the first drive detection vibrating arm 11a to the fourth drive detection vibrating arm 11d of the gyro element 20.

MODIFIED EXAMPLE 4

In the gyro element 40, the groove part 15 is formed only in the drive detection vibrating arm 13, however, the groove part 15 may be also formed in the other first drive vibrating arm 4a, second drive vibrating arm 4b, third drive vibrating arm 4c, and fourth drive vibrating arm 4d. The same configuration may apply to the gyro elements 1, 20, 30.

MODIFIED EXAMPLE 5

The gyro elements 1, 20, 30, 40 are formed from crystal as a piezoelectric material, however, lithium niobate ($LiNbO_3$), lead zirconium titanate (PZT), or the like other than crystal may be used, not limited to crystal. Further, the gyro elements 1, 20, 30, 40 are not limited to the piezoelectric material, but may be a non-piezoelectric material such as silicon or germanium, and, in this case, the excitation electrodes are combined with a piezoelectric material for vibration. Thereby, in the gyro elements 1, 20, 30, 40, an appropriate material may be selected according to the required characteristics, use application, or the like, and options are increased.

The entire disclosure of Japanese Patent Application No. 2011-173613, filed Aug. 9, 2011 is expressly incorporated by reference herein.

What is claimed is:

1. A physical quantity detection element comprising:
a base part;
when coordinate axes having an X-axis passing through an origin as a center of gravity of the base part and a Y-axis passing through the origin and being orthogonal to the X-axis are defined, and
when a region in which both an X-coordinate and a Y-coordinate take positive values is defined as a first quadrant, a region in which the X-coordinate takes a negative value and the Y-coordinate takes a positive value is defined as a second quadrant, a region in which both the X-coordinate and the Y-coordinate take negative values is defined as a third quadrant, and a region in which the X-coordinate takes a positive value and the Y-coordinate takes a negative value is defined as a fourth quadrant,
a first connection part and a second connection part connecting to the base part and provided at both sides of the base part along the X-axis;
a first drive vibrating arm and a second drive vibrating arm respectively extending from the first connection part in opposite directions to each other along the Y-axis;
a third drive vibrating arm and a fourth drive vibrating arm respectively extending from the second connection part in opposite directions to each other along the Y-axis;
a first drive detection vibrating arm extending in the first quadrant direction and obliquely extending with respect to the X-axis, the first drive detection vibrating arm directly extending from the first drive vibrating arm without the first connection part intervening therebetween;
a second drive detection vibrating arm extending in the fourth quadrant direction and obliquely extending with respect to the X-axis, the second drive detection vibrating arm directly extending from the second drive vibrating arm without the first connection part intervening therebetween;

a third drive detection vibrating arm extending in the second quadrant direction and obliquely extending with respect to the X-axis, the third drive detection vibrating arm directly extending from the third drive vibrating arm without the second connection part intervening therebetween; and a fourth drive detection vibrating arm extending in the third quadrant direction and obliquely extending with respect to the X-axis, the fourth drive detection vibrating arm directly extending from the fourth drive vibrating arm without the second connection part intervening therebetween.

2. The physical quantity detection element according to claim 1, further comprising a first detection vibrating arm and a second detection vibrating arm respectively extending from the base part in opposite directions to each other along the Y-axis.

3. The physical quantity detection element according to claim 1, wherein the first drive vibrating arm through the fourth drive vibrating arm comprise drive signal electrodes for exciting vibrations, and
the first drive detection vibrating arm through the fourth drive detection vibrating arm comprise drive signal electrodes for exciting vibrations and detection signal electrodes for detecting physical quantities.

4. The physical quantity detection element according to claim 1, wherein the first drive detection vibrating arm and the second drive detection vibrating arm extend from first and second positions of the first and second drive vibrating arms, respectively, and the first and second positions are spaced apart from the first connection part, and
the third drive detection vibrating arm and the fourth drive detection vibrating arm extend from third and fourth positions of the third and fourth drive vibrating arms, respectively, and the third and fourth positions are spaced apart from the second connection part.

5. The physical quantity detection element according to claim 1, wherein the first drive detection vibrating arm through the fourth drive detection vibrating arm comprise groove parts.

6. The physical quantity detection element according to claim 1, wherein
the physical quantity detection element is formed using a piezoelectric material having a crystal structure of hexagonal crystal.

7. A physical quantity detection device comprising:
the physical quantity detection element according to claim 1;
a driver circuit that supplies drive signals to at least one of the first drive vibrating arm through the fourth drive vibrating arm; and
a detector circuit that detects a physical quantity from detection signals of at least one of the first drive detection vibrating arm through the fourth drive detection vibrating arm.

8. An electronic apparatus comprising the physical quantity detection element according to claim 1.

9. A physical quantity detection element comprising:
a base part;
when coordinate axes having an X-axis passing through an origin as a center of gravity of the base part and a Y-axis passing through the origin and being orthogonal to the X-axis are defined, and
when a region in which both an X-coordinate and a Y-coordinate take positive values is defined as a first quadrant, a region in which the X-coordinate takes a negative value and the Y-coordinate takes a positive value is defined as a second quadrant, a region in which both the X-coordinate and the Y-coordinate take negative values is defined as a third quadrant, and a region in which the X-coordinate takes a positive value and the Y-coordinate takes a negative value is defined as a fourth quadrant,
a first connection part and a second connection part connecting to the base part and provided at both sides of the base part along the X-axis;
a first drive vibrating arm and a second drive vibrating arm respectively extending from the first connection part in opposite directions to each other along the Y-axis;
a third drive vibrating arm and a fourth drive vibrating arm respectively extending from the second connection part in opposite directions to each other along the Y-axis;
a first drive detection vibrating arm extending in the second quadrant direction and obliquely extending with respect to the X-axis, the first drive detection vibrating arm directly extending from the first drive vibrating arm without the first connection part intervening therebetween;
a second drive detection vibrating arm extending in the third quadrant direction and obliquely extending with respect to the X-axis, the second drive detection vibrating arm directly extending from the second drive vibrating arm without the first connection part intervening therebetween;
a third drive detection vibrating arm extending in the first quadrant direction and obliquely extending with respect to the X-axis, the third drive detection vibrating arm direct extending from the third drive vibrating arm without the second connection part intervening therebetween; and
a fourth drive detection vibrating arm extending in the fourth quadrant direction and obliquely extending with respect to the X-axis, from the fourth drive detection vibrating arm directly extending the fourth drive vibrating arm without he second connection part intervening therebetween.

10. The physical quantity detection element according to claim 9, further comprising a first detection vibrating arm and a second detection vibrating arm respectively extending from the base part in opposite directions to each other along the Y-axis.

11. The physical quantity detection element according to claim 9, wherein the first drive vibrating arm through the fourth drive vibrating arm comprise drive signal electrodes for exciting vibrations, and
the first drive detection vibrating arm through the fourth drive detection vibrating arm comprise drive signal electrodes for exciting vibrations and detection signal electrodes for detecting physical quantities.

12. The physical quantity detection element according to claim 9, wherein the first drive detection vibrating arm and the second drive detection vibrating arm extend from first and second positions of the first and second drive vibrating arms, respectively, and the first and second positions are spaced apart from the first connection part, and
the third drive detection vibrating arm and the fourth drive detection vibrating arm extend from third and fourth positions of the third and fourth drive vibrating arms, respectively, and the third and fourth positions are spaced apart from the second connection part.

13. The physical quantity detection element according to claim 9, wherein the first drive detection vibrating arm through the fourth drive detection vibrating arm have groove parts.

14. The physical quantity detection element according to claim 9, wherein
the physical quantity detection element is formed using a piezoelectric material having a crystal structure of hexagonal crystal.

15. A physical quantity detection device comprising:
the physical quantity detection element according to claim 9;
a driver circuit that supplies drive signals to at least one of the first drive vibrating arm through the fourth drive vibrating arm; and
a detector circuit that detects a physical quantity from detection signals of at least one of the first drive detection vibrating arm through the fourth drive detection vibrating arm.

16. An electronic apparatus comprising the physical quantity detection element according to claim 9.

* * * * *